US008620273B2

(12) United States Patent
Maguire et al.

(10) Patent No.: US 8,620,273 B2
(45) Date of Patent: *Dec. 31, 2013

(54) USER INTERFACE AND METHOD OF VIEWING UNIFIED COMMUNICATIONS EVENTS ON A MOBILE DEVICE

(75) Inventors: Michael Maguire, London (GB); Ronald Scotte Zinn, Waterloo (CA)

(73) Assignee: BlackBerry Limited, Waterloo (CA)

( * ) Notice: Subject to any disclaimer, the term of this patent is extended or adjusted under 35 U.S.C. 154(b) by 77 days.

This patent is subject to a terminal disclaimer.

(21) Appl. No.: 12/211,223

(22) Filed: Sep. 16, 2008

(65) Prior Publication Data

US 2011/0195691 A9    Aug. 11, 2011

Related U.S. Application Data

(62) Division of application No. 10/500,269, filed as application No. PCT/CA02/02030 on Dec. 23, 2002, now abandoned.

(60) Provisional application No. 60/342,130, filed on Dec. 26, 2001.

(51) Int. Cl.
*H04M 3/42* (2006.01)

(52) U.S. Cl.
USPC ......... 455/412; 455/566; 455/414.1; 455/415

(58) Field of Classification Search
USPC ...................... 455/566, 414.1, 415
See application file for complete search history.

(56) References Cited

U.S. PATENT DOCUMENTS

| 5,394,445 | A | * | 2/1995 | Ball et al. ............... 379/88.21 |
| 5,579,472 | A | | 11/1996 | Keyworth, II et al. |
| 5,592,546 | A | * | 1/1997 | Takahashi ............... 379/355.05 |
| 5,781,857 | A | | 7/1998 | Hwang et al. |
| 6,064,725 | A | | 5/2000 | Nakanishi |
| 6,340,658 | B1 | | 1/2002 | Cannon |
| 6,571,275 | B1 | | 5/2003 | Dong et al. |
| 6,640,239 | B1 | | 10/2003 | Gidwani |
| 6,661,877 | B1 | | 12/2003 | Christofferson et al. |

(Continued)

FOREIGN PATENT DOCUMENTS

| CN | 1224294 | 7/1999 |
| CN | 1246016 | 3/2000 |

(Continued)

OTHER PUBLICATIONS

CIPO: Office Action for Application 2471831 dated Jun. 14, 2010 (2 pages).

(Continued)

*Primary Examiner* — Charles Shedrick
(74) *Attorney, Agent, or Firm* — Jenna L. Wilson; Dimock Stratton LLP

(57) ABSTRACT

A user interface and method for viewing communications events on a mobile device includes a user interface, a communications event handler, and a communications event database is disclosed herein. The communications event handler interfaces with the database and the user interface to the provide a user of the mobile device with a communications event history associated with the correspondent of an incoming communications event. Additionally the communications event handler interfaces with the database and the user interface to the provide a user of the mobile device with a communications event history for a specified correspondent.

32 Claims, 6 Drawing Sheets

(56) References Cited

U.S. PATENT DOCUMENTS

| | | | |
|---|---|---|---|
| 6,678,372 B1 | 1/2004 | Koizumi | |
| 6,778,642 B1 | 8/2004 | Schmidt, Jr. et al. | |
| 6,792,082 B1 * | 9/2004 | Levine | 379/67.1 |
| 6,868,283 B1 | 3/2005 | Bonansea et al. | |
| 6,961,420 B2 * | 11/2005 | DeSalvo | 379/355.02 |
| 7,007,239 B1 * | 2/2006 | Hawkins et al. | 715/780 |
| 7,028,263 B2 * | 4/2006 | Maguire | 715/758 |
| 7,035,674 B1 * | 4/2006 | Holder et al. | 455/566 |
| 7,096,009 B2 | 8/2006 | Mousseau et al. | |
| 7,225,409 B1 | 5/2007 | Schnarel et al. | |
| 7,283,808 B2 | 10/2007 | Castell et al. | |
| 7,295,836 B2 * | 11/2007 | Yach et al. | 455/415 |
| 7,484,177 B2 * | 1/2009 | Maguire | 715/758 |
| 7,672,879 B1 | 3/2010 | Kumar et al. | |
| 2001/0012347 A1 | 8/2001 | Fujino et al. | |
| 2001/0044849 A1 | 11/2001 | Ndili et al. | |
| 2001/0046853 A1 * | 11/2001 | Aoyama et al. | 455/415 |
| 2002/0013815 A1 * | 1/2002 | Obradovich et al. | 709/204 |
| 2002/0015061 A1 * | 2/2002 | Maguire | 345/752 |
| 2002/0027981 A1 * | 3/2002 | Bedrosian et al. | 379/201.08 |
| 2002/0037754 A1 * | 3/2002 | Hama et al. | 455/566 |
| 2002/0039914 A1 * | 4/2002 | Hama et al. | 455/566 |
| 2002/0099456 A1 * | 7/2002 | McLean | 700/83 |
| 2002/0151334 A1 * | 10/2002 | Sharma | 455/566 |
| 2002/0160805 A1 * | 10/2002 | Laitinen et al. | 455/550 |
| 2003/0003935 A1 | 1/2003 | Vesikivi et al. | |
| 2003/0013483 A1 | 1/2003 | Ausems et al. | |
| 2003/0023688 A1 | 1/2003 | Panttaja et al. | |
| 2003/0026393 A1 | 2/2003 | Ng et al. | |
| 2003/0034878 A1 | 2/2003 | Hull et al. | |
| 2003/0064759 A1 * | 4/2003 | Kurokawa et al. | 455/566 |
| 2003/0120957 A1 | 6/2003 | Pathiyal | |
| 2004/0010808 A1 | 1/2004 | deCarmo | |
| 2004/0125766 A1 * | 7/2004 | Takano et al. | 370/328 |
| 2004/0198302 A1 * | 10/2004 | Hutchison et al. | 455/343.1 |
| 2004/0203651 A1 * | 10/2004 | Qu et al. | 455/414.1 |
| 2005/0130631 A1 | 6/2005 | Maguire et al. | |
| 2007/0190963 A1 * | 8/2007 | Ananthanarayanan et al. | 455/343.1 |
| 2009/0011741 A1 * | 1/2009 | Maguire et al. | 455/412.1 |
| 2010/0274792 A1 * | 10/2010 | Bhangi | 707/754 |

FOREIGN PATENT DOCUMENTS

| | | | | |
|---|---|---|---|---|
| EP | 0 745 937 A2 | 12/1996 | | |
| EP | 0 809 411 A1 | 11/1997 | | |
| EP | 0 920 168 A2 | 6/1999 | | |
| EP | 0 967 773 A2 | 12/1999 | | |
| EP | 1 148 423 A1 | 10/2001 | | |
| EP | 1148413 A2 | 10/2001 | | |
| EP | 1 246 483 A2 | 10/2002 | | |
| EP | 1484703 A1 | 12/2004 | | |
| EP | 1667388 A | 6/2006 | | |
| WO | 02103967 A | 12/2002 | | |
| WO | WO 2004017654 A1 * | 2/2004 | | H04Q 7/32 |
| WO | 2005115035 A | 12/2005 | | |

OTHER PUBLICATIONS

EPO: Office Action for EP Patent App. No. 07 002 178.7-2414, dated Jul. 1, 2010, 7 pages.

SIPO: First Office Action for Chinese Patent App. No. 200810093908.6, dated Jul. 12, 2010 (with English translation),17 pages and 9 pages.

CIPO: Office Action dated Aug. 13, 2009 for Canadian Patent Application No. 2,471,831 citing European Patent Application 0967773 (2 pages).

Sony: Sony Ericsson User's Manual, Third Edition (Dec. 2001), Sony Ericsson Mobile Communications, AB.

CIPO: Office Action dated Jul. 4, 2007 for Canadian Patent Application No. 2,471,831 citing European Patent Application 1 148 423.

European examination report, issued Sep. 9, 2008, for EP Application No. 07002178.

International Preliminary Examination Report mailed Mar. 15, 2004. In corresponding PCT patent application No. PCT/CA0202030.

First Examination Report mailed Jul. 13, 2005. In corresponding India patent application No. 2034/DELNP/2004.

Notification of First Office Action mailed Dec. 9, 2005. In corresponding Chinese patent application No. 02828311.2. English translation included.

Notification of Second Office Action mailed May 26, 2006. In corresponding application No. 02828311.2. English translation included.

Extended European Search report mailed May 11, 2007. In corresponding European patent application No. 070021787.

Examination report mailed Aug. 7, 2009. In corresponding European patent application No. 07002178.7.

Examination report mailed Sep. 9, 2008. In corresponding European patent application No. 07002178.7.

Examination report mailed Jul. 1, 2010. In corresponding European patent application No. 07002178.7.

The First Office Action mailed Jul. 12, 2010. In corresponding Republic of China patent application No. 200810093908.6.

The International Preliminary Examination report mailed Mar. 15, 2004. In corresponding PCT patent application No. PCT/CA02/02030.

Written Opinion mailed Sep. 29, 2003. In corresponding PCT patent application No. PCT/CA02/02030.

Summons to attend oral proceedings pursuant to Rule 115(1) EPC mailed Nov. 10, 2011. In corresponding European patent application No. 07002178.7.

Reexamination Notification dated May 3, 2013 from CN 200810093908.6, pp. 1-10.

* cited by examiner

USER INTERFACE AND METHOD OF VIEWING UNIFIED COMMUNICATIONS EVENTS ON A MOBILE DEVICE

This application is a divisional of U.S. patent application Ser. No. 10/500,269, filed on Jun. 24, 2004, now abandoned which is a national stage filing under 35 USC 371 of International Patent Application PCT/CA02/02030, filed on Dec. 23, 2002, which in turn claims the benefit of priority from U.S. Provisional Application No. 60/342,130 filed on Dec. 26, 2001. Each of these prior applications is hereby incorporated by reference, in their entirety, into this patent application.

FIELD OF THE INVENTION

This invention relates generally to a user interface for messaging. More particularly, the invention relates to user interfaces for displaying a communications event in context with select stored communications events.

BACKGROUND OF THE INVENTION

Most cellular networks such as Code Division Multiple Access (CDMA) and Global Service Mobile (GSM) networks support data services in addition to standard telephony based services. Short Messaging Service (SMS) and Wireless Application Protocol (WAP) are data centric services available on many cellular networks. Data networks, such as MobiTex™, Datatac™, as well as advanced networks such as General Packet Radio Service (GPRS), Universal Mobile Telecommunications System (UMTS), Enhanced Data for GSM Enhancement (EDGE) and 1× that overlay cellular networks, allow an appropriately configured mobile device to offer data services such as e-mail, web browsing, as well as SMS and Multimedia messaging service (MMS) messaging, and WAP data sessions.

Communications events include telephone calls, both sent and received, SMS messages both sent and received, e-mail correspondences both sent and received, and wireless application protocol sessions, among other data based transactions. Each communications event has at least two parties, the user of the mobile device and at least one correspondent. Each correspondent can have multiple contact addresses, such a work phone number, a home phone number, a mobile phone number, an SMS address, and a plurality of email addresses.

Mobile devices were originally intended to provide telephony services, and have, with the addition of data centric features, become complex to operate. The user interfaces currently available for viewing the history of communications events on a mobile device, typically only enable a user to view a history of one type of communications events, or a subset thereof, and from that history view the contents of a communications event. This makes sense in a voice only environment, but the addition of data services has exposed this interface paradigm as insufficient.

FIG. 1 illustrates a user interface 10 of the prior art. User interface 10 displays a notification 12 that a new message, such as an e-mail or SMS message has been received. The user of the mobile device is presented with the option to either exit the notification 14, or read the received message 16. This user interface does not permit the user to view the context in which the received message should be interpreted.

FIG. 2 illustrates a second user interface of the prior art 18. User interface 18 illustrates a list of recent telephone calls. Once again the user is presented with the option to exit 14, and additionally is given the option to place a call 22 to one of the recent callers, or to delete 20 a caller from the list of recent calls. Call lists of this type provide either separate lists of sent and received calls, or provide an integrated list of sent at received calls.

Presently, when a mobile device receives an incoming communications event, such as an SMS message, the only information provided to the user is that an SMS message has been received. This notification may indicate the originating SMS address. The user can then either view the SMS message, or scroll through a collective in-box of SMS messages to determine the last SMS message received from the same originating address. If the user wishes to view the last SMS message sent to the party originating the incoming SMS message, the user must check the SMS out box on the mobile device. Additionally, if the user would like to check to see when the last call made to the SMS originating address, or received from the originating SMS address occurred on, the user must check either the incoming or outgoing call logs. If email services are integrated in the mobile device, an additional list must be examined. This provides a plurality of different lists that a user must examine to determine the communications event history concerning a correspondent. If a correspondent has multiple contact addresses, viewing all communications events with the correspondent is further complicated.

It is, therefore, desirable to provide a method and system for handling communications events in a mamner that provides the user of a mobile device with the context of the communications event through a presentation of the communications event history associated with a given correspondent.

SUMMARY OF THE INVENTION

It is an object of the present invention to obviate or mitigate at least one disadvantage of previous communications event handling systems.

In a first aspect, the present invention provides a method of handling a communications event in a mobile device having a user interface. The method includes identifying, in a communications event database, a correspondent associated with the communications event, retrieving, from the communications event database, a communications event history associated with the correspondent and controlling the user interface to provide the retrieved communications event history to a user. In an embodiment of the first aspect of the present invention, the step of identifying is preceded by the step of determining a communications event type for the communications event, where the communications event type of the communications event is selected from a list including telephony based voice communications events, e-mail communications events, short messaging service communications event and wireless applications protocol communications event. In another embodiment of the present invention, the communications event is an incoming communications event, and the method further includes the step of receiving the incoming communications event prior to identifying the correspondent. In another embodiment of the present invention, the user interface is a display, and the step of controlling the user interface includes displaying the retrieved communications event history on the display. In yet a further embodiment of the present invention, the method includes adding the incoming communications event to the communications event history in the communications event database. In embodiments of the present invention, receiving an incoming communications event and identifying the correspondent includes one of receiving a telephony based phone call and extracting a phone number from call display information, receiving an incoming email message and extracting an email address from the header of an email message and receiving an incoming short messaging service (SMS) message and extracting an originating address from a SMS message. In a further embodiment of the present invention, identifying the correspondent further includes cross referencing one of the extracted phone number, the extracted email address and the extracted originating address, with entries in an address book accessible to the mobile device. In yet a further embodiment of the present invention the method includes the step of controlling the user interface to provide the user with communications event handling options, where controlling the user interface can include providing the user an option to either ignore or answer an incoming telephony based call, or read or ignore one of the incoming email message and the incoming SMS message. Another embodiment of the present invention includes updating the communications event database to reflect a status of the incoming communications event after providing the user with communications event handling options.

In a second aspect of the present invention, there is provided a mobile device, having a user interface and a transceiver for transmitting and receiving communications events. The mobile device includes a communications event database, and a communications event handler. The communications event database is for storing a communications event history associated with a correspondent. The communications event handler is in communication with the communications event database for retrieving from the communications event database the communication event history in response to a communications event, and is for controlling the user interface to provide the retrieved communication event history to a user.

In an embodiment of the second aspect of the present invention, the communications event handler includes a communications event type identifier for identifying the type of the communications event from a list including telephony based voice communications events, e-mail communications events, short messaging service communications event and wireless applications protocol communications event. In another embodiment of the second aspect of the present invention, the user interface is a display, and the communications event handler includes a display controller for controlling the display to display the retrieved communication event history. In another embodiment of the present invention, communications event handler includes a correspondent identifier for identifying the correspondent of an incoming communications event, and the correspondent identifier is connected to the transceiver for receiving call display information, and includes means for identifying the correspondent of an incoming communications event based on the received call display information, and includes header parsing means for parsing the header of one of a received email message and a received SMS message to extract an originating address, and includes means for identifying the correspondent of an incoming communications event based on the extracted originating address. In a further embodiment, correspondent identifier includes an address book interface for cross referencing the received call display information and the extracted originating address with entries in an address book accessible to the mobile device to identify the correspondent. In yet another embodiment of the second aspect of the present invention, the communications event handler includes a user interface controller for controlling the user interface to provide a user with communications event handling options and also includes means for updating the communications event database to reflect the status of an incoming call.

In a third aspect of the present invention, there is provided a communications event handler for integration in a communication device having a user interface. The communications event handler includes a database interface and a user interface controller. The database interface is for communicating with a communications event database to retrieve a communications event history associated with a correspondent in response to a communications event. The user interface controller is for receiving the retrieved communications event history from the database interface, and for controlling the user interface to provide the retrieved communication event history to a user.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for tracking originating, and received, communications events on a mobile device. By tracking received and transmitted communications events, a mobile device can provide a user with the context of the communication with any party.

In the present invention a mobile device provides an integrated user interface through which a user can view communications events in which a particular correspondent has partaken. A mobile device of the present invention makes use of a communications event database to track all incoming and outgoing communications events with various correspondents.

The present invention provides a unified view of communications events, so that a user can determine the context of any received communications event, or can determine the context of a communications event to be placed. Thus, upon receipt of a SMS message, or other communications events, after identifying the type of the communications event, in addition to notifying the user that a message has been received, the mobile device will present the user with a listing of the most recent communications events that are associated with the originating address of the message. The user is also given the option of viewing information about the prior communications events, which would include viewing prior SMS messages, viewing information about the data received for a wireless application protocol browsing session, or the call length and dates of any placed or received calls. This information will allow the user to better contextualise the content of the new message. In a presently preferred embodiment, the user is able to set criteria that must be matched by the properties of an incoming communications event in order for the retrieval of the communications event history to begin. This allows the user the ability to only be presented with a communications event history for selected correspondents, and selected types of communications events.

Figure 1:
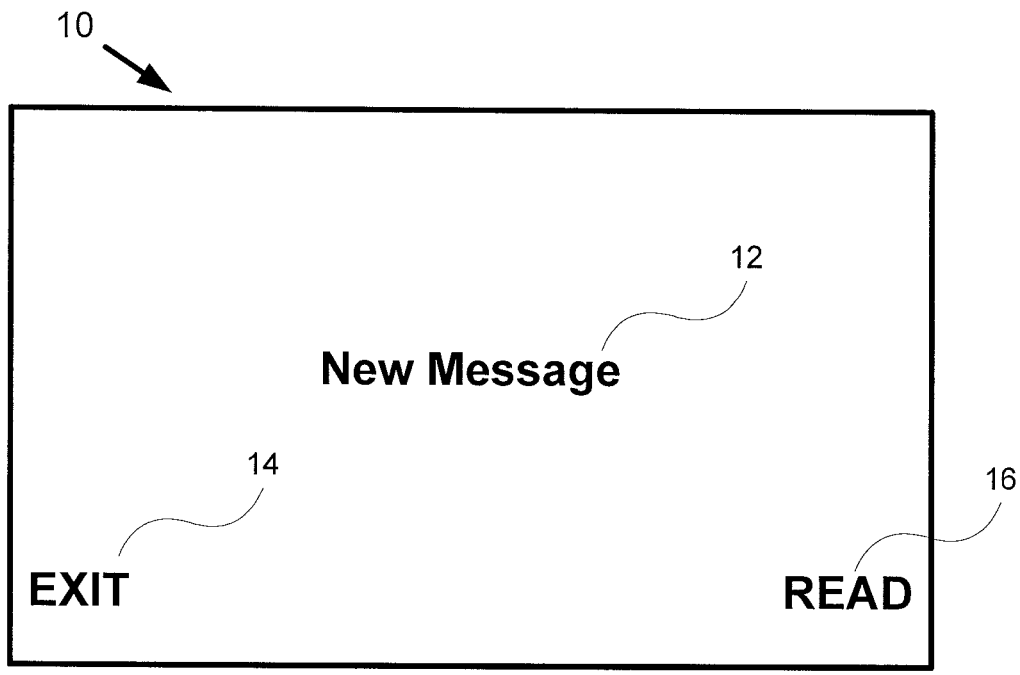
FIG. 1 illustrates a communications event handling system of the prior art.
Figure 2:
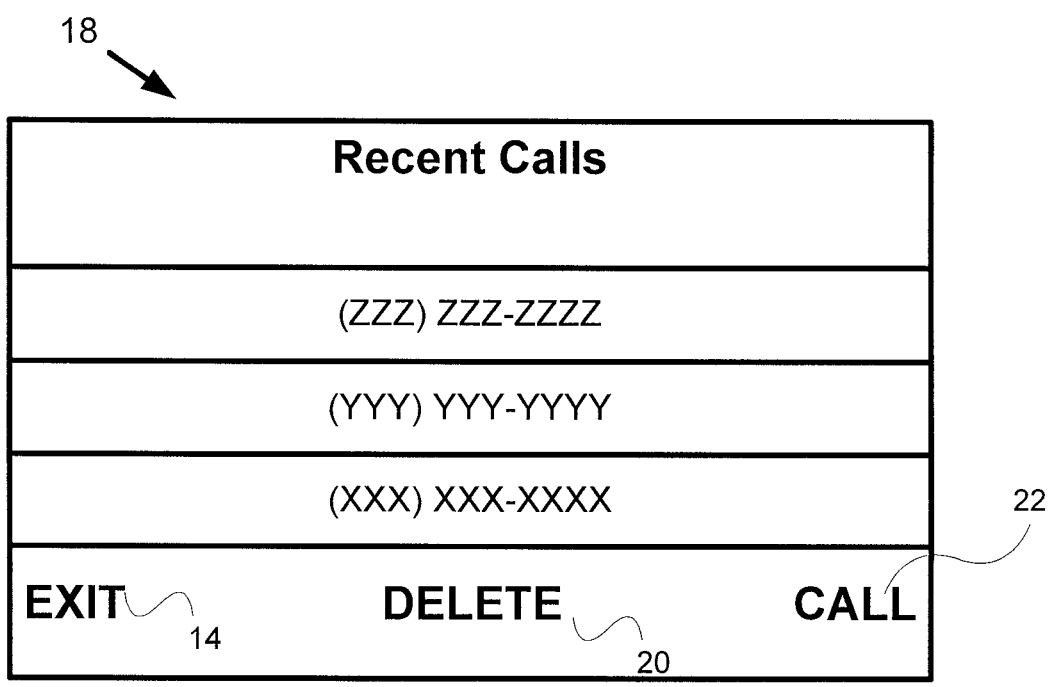
FIG. 2 illustrates a communications event history listing of the prior art.
Figure 3:
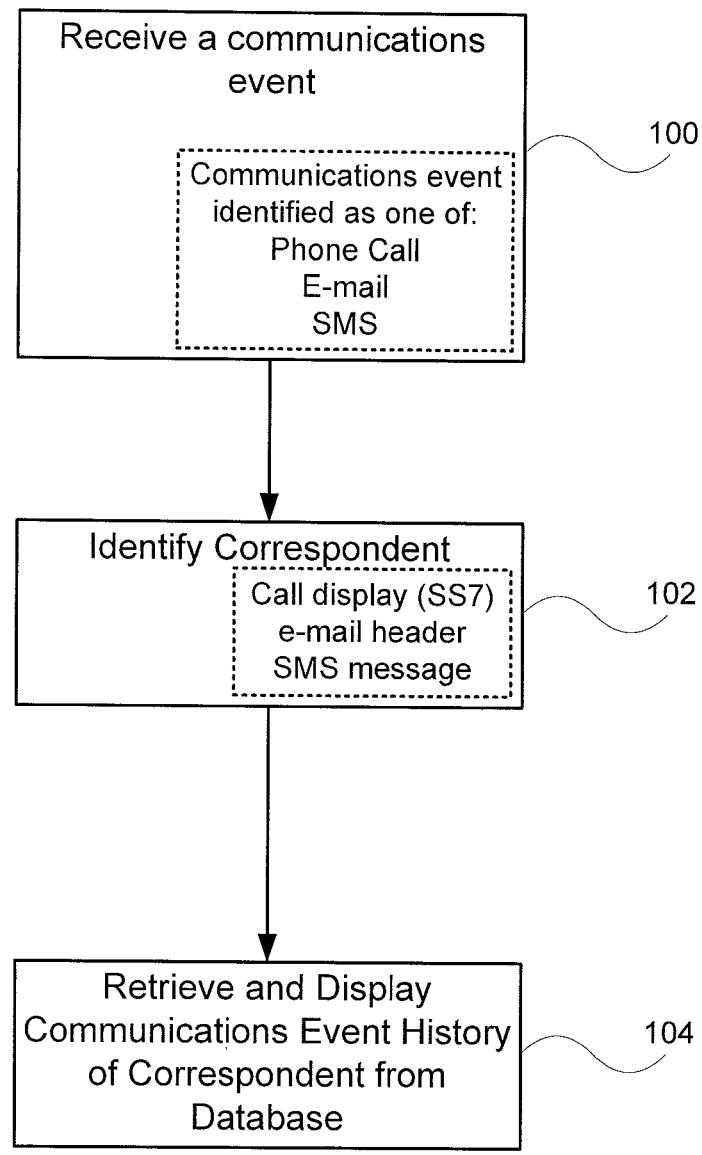
FIG. 3 is a flow chart illustrating a method of the present invention.

FIG. 3 illustrates an exemplary method of the present invention. In step 100, the mobile device receives a communications event. Preferably, as a part of receiving the communications event in step 100, the mobile device identifies the communications event as one of a set of known communications event types including a phone call, an e-mail message and an SMS message, among other known types of communications events. Upon receipt of the communications event, the mobile device identifies the correspondent in the communications event in step 102. The identification of the correspondent is preferably carried out using call display, a signalling system 7 (SS7) type feature if the communications event is a phone call, through an analysis of an e-mail header if the communications event is an e-mail message or through parsing the header information in a SMS message. Upon identifying the correspondent in step 102, the mobile device uses the correspondent's identification to retrieve and display a communications event history detailing the communications event the correspondent has been involved with in step 104. The communications event history retrieved in step 104 is typically retrieved from a database either in the mobile device, or accessible to the mobile device, that is used to track communications events. Upon retrieval of the communications event history from the database, the mobile device displays the communications event history to the user. Preferably, the displaying of the information to the user allows the user to view prior SMS and e-mail messages to determine the context of a received message. Additionally, the user is preferably able to view a listing of all sent and received calls involving the correspondent along with the time and date at which the call occurred, the length of the call if the call was answered, and an indication if the call was or was not answered. In a presently preferred embodiment of the present method of the invention, the mobile device displays a summary of communications events with the correspondent that both originated from, and were received by the mobile device. It is, however, fully contemplated that in certain embodiments the user is presented with only incoming, or outgoing communications events in the summary. It is preferable that the user be provided with an option to view incoming and outgoing messages on a single display, only incoming messages, or only outgoing communications events.

One skilled in the art will readily appreciate that when the mobile device of the present invention receives a communications event in step 100 the communications event can be any of a number of event types. Typically, upon receiving a communications event in step 100, the mobile device analyses the incoming event and determines its specific type. This determination of the communications event type can be performed in numerous ways understood by those skilled in the art. One such method involves determining the communications event type based on the channel over which the communications event was received. For example, if the device supports GSM communications as well as GPRS communications, and the mobile device is capable of supporting voice, SMS, e-mail and WAP type communications events, a communications event received over a GPRS communications channel will be either a WAP or e-mail based communication, whereas a communications event received over the GSM communications channel will be either an SMS or voice type communications event. After narrowing the selection to the two choices based on the communications channel, the mobile device can parse the header associated with the incoming communications event to determine its specific type. For example, a WAP data session and an email message typically conform to different standard formats, and based on an analysis of the format, a determination can be made. The differentiation between an SMS message and a telephony based voice communications event is known in the art, and can be easily implemented. It is envisioned that on advanced networks all data and voice traffic will be carried on the same channel, much as both voice and data are carried in a Voice-over-IP data network. In such a network, header information associated with datagrams, or other data units, provide identification of the different types of communications event. One skilled in the art will readily appreciate that a number of alternate method can be implemented without departing from the scope of the present invention.

Figure 4:
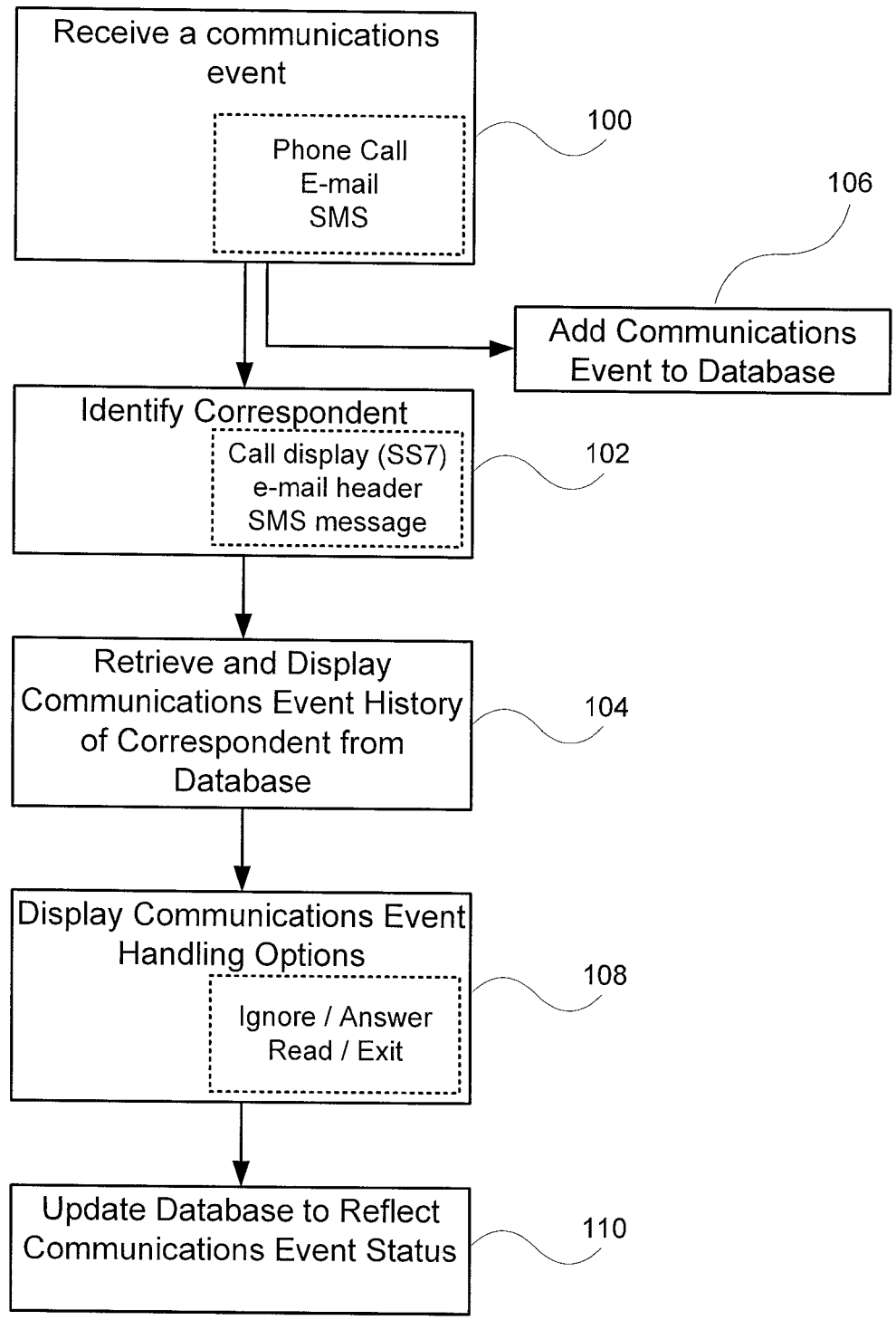
FIG. 4 is a flow chart illustrating an alternate method of the present invention.

FIG. 4 illustrates a further embodiment of the method of FIG. 3. In the method illustrated in FIG. 4, steps 100, 102, and 104 remain the same. Additionally, in step 106 after a communications event has been received the communications event is added to the database of the mobile device. This step can be performed at any point in the process, and is shown as following the receipt of the communications event as a matter of preference. In step 108, the mobile device presents a user interface that allows the user to either ignore or answer an incoming telephone call, or alternatively to either read a message or exit the notification in the case of a received SMS, or e-mail message. It is preferable that these options be presented along with the retrieved communications event history, so that the user can make a decision as to what to do with the incoming communications event based on the event history. In step 110, the database is updated to reflect the communications event status.

As described above, the user interface preferably indicates to the user whether or not a SMS or e-mail message has been read, or replied to, and whether or not a call was answered. These factors are collectively described as the status of a message. In step 110, the database is updated to reflect whether or not the user chose to ignore or answer a call in step 108, or whether the user chose to read the message or exit the notification in step 108. In a presently preferred embodiment, the identification of the correspondent in step 102 is preformed by cross-referencing the information obtained through either call display, the analysis of the e-mail header, or the analysis of the SMS message to determine the originating address from which the communications event was placed, with information contained in an address book accessible to the mobile device. It is common for numerous correspondents to have a variety of contact addresses, including telephone numbers corresponding to cellular phones, home phones, and office phones, as well as a plurality of e-mail, and SMS addresses. Through cross-linking of the correspondent identification information obtained in step 102 with the address book of the mobile device, it is possible to provide the user of the mobile device with a communications event history that includes all correspondence, and telephone calls made to, or answered from the identified correspondent.

Figure 5:
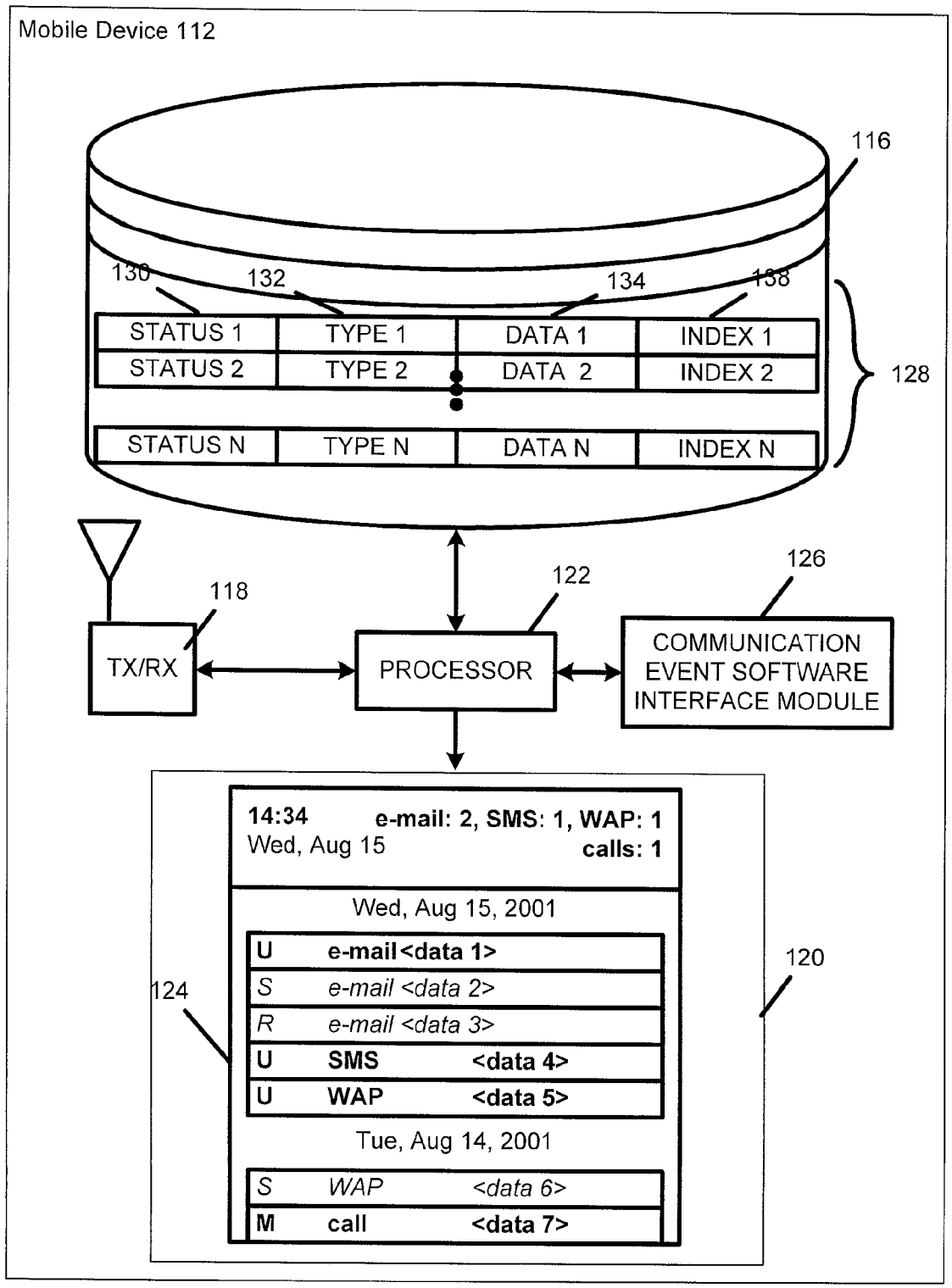
FIG. 5 illustrates an exemplary system of the present invention.

FIG. 5 illustrates an embodiment of mobile device 112 according to the present invention. Mobile device 112 preferably includes database 116, transceiver 118, processor 122, and display 120. In alternate embodiments of the present invention, mobile device 112 does not include database 116, and instead accesses a central server which hosts database 116 through a wireless link. In additional embodiment, mobile device 112 either includes an address book having a plurality of contact addresses for a variety of correspondents, or has access to such an address book using a wireless connection. Communications event software interface module 126 is preferably a software application executed by processor 122, and is a specific example of a communications event handler according to the present invention. It is contemplated that the communications event handler can be implemented as a separate hardware component, which may or may not implement software based routines. In a further embodiment, the communications event handler can be hardware enabled and integrated with processor 122.

Database 116 is preferably structured to have at least one table 128. In table 128, four data fields are identified. The first identified data field is status 130. Status field 130 indicates whether or not an e-mail or SMS message has been read, or whether or not a telephone call was answered. Type field 132 denotes the type of communications event of the record. Type 132 is used to identify whether the communications event was an e-mail message, a telephone call, or an SMS message. In a presently preferred embodiment, the type field also indicates whether the communications event originated from, or was received by mobile device 112. The third entry in table 128 is data field 134. The data field 134 contains information about the communications event of this record. In a presently preferred embodiment, the data field for a SMS or e-mail message would include the body of the message. For a telephone call, in a presently preferred embodiment, data field 134 would indicate the time that the call was placed, and the duration of the call. The final field of Table 128 is index 138. One skilled in the art will readily appreciate that a number of indexing mechanisms can be employed in either relational, or flat file, database types. The use of index 138 is to be able to easily identify and find a record related to a specific call. One skilled in the art will recognize that a number of entries in this Table will be introduced as the mobile device 112 begins communications events with various correspondents. One skilled in the art will recognize that in conjunction with an address book accessible by mobile device 112, the index field 138 and status field 130 can be correlated to determine a communications event history for a number of different correspondents. Transceiver 118 is used to both transmit and receive communications events. Upon receipt of a communications event, transceiver 118 begins to pass data to processor 122. In conjunction with communications event software interface module 126, processor 122 performs the method illustrated in FIG. 3. As a result, processor 122 interacts with display 120 upon receipt of a communications event and after querying database 116. Thus, processor 122 uses display 120 to provide interface 124. Interface 124 illustrates a date and time, as well as the number of e-mail, SMS, WAP, and telephone call type communications events between the mobile device and the correspondent. As is illustrated in interface 124, the status field 130, the type field 132, and data field 134 of table 128 are used to provide the user with an indication that unread mail messages exist, sent mail messages, received mail messages and placed calls have been made between the mobile device and the correspondent.

Transceiver 118 can be replaced by separate transmitters and receivers, and is intended to allow the mobile device to receive communications over a wireless link. Presently preferred embodiments of the present invention employ transceivers capable of receiving CDMA voice communication as well as 1× data communications, in an alternate embodiment, the transceiver is designed to receive GPRS, and GSM data and voice services, respectively. One skilled in the art will readily appreciate that a transceiver capable of receiving a variety of other combinations of voice and data protocols are contemplated in the present invention.

Display 120 is preferably a liquid crystal display, and may optionally be a touch sensitive liquid crystal display, so that a user can be provided with user interface acknowledgement buttons on the screen of the device itself. Implementations of graphical interfaces on liquid crystal displays, and touch sensitive liquid crystal displays will be well understood by those skilled in the art of mobile device design. It is fully contemplated that though mobile device 112 has been described herein as having display 120, that display 120 can be replaced with other user interfaces. Examples of such user interfaces include audio interfaces and dynamic Braille pads for use by individuals with visual impairments.

Processor 122 is connected to the database 116, and is capable of performing database queries on database 116 to obtain information from the call event database 116. Additionally, processor 122 is connected to an address book so that the identified correspondent from step 102 can be cross-referenced to the address book and match to a name in the address book. This will allow mobile device 112 to provide the user with a call event history from the call event database 116 that includes all communications events in which the identified correspondence has partaken, regardless of the communication address used by the correspondent. Upon identifying the correspondent through cross-referencing the address book, processor 122 queries communications event database 116 to obtain a listing of all communications events between the user of the mobile device and the identified correspondent. The results of this query are then formatted and provided to the user on display 120.

In a presently preferred embodiment of the system illustrated in FIG. 4, the communications event software interface module 126 includes a communications event type identifier. The identifier is for determining the type associated with the communications event. The identified type is stored in type field 132 in database 116. In the illustrated embodiment, the identifier is preferably a software routine, and in a more generic implementation is a module in the communications event handler.

Figure 6:
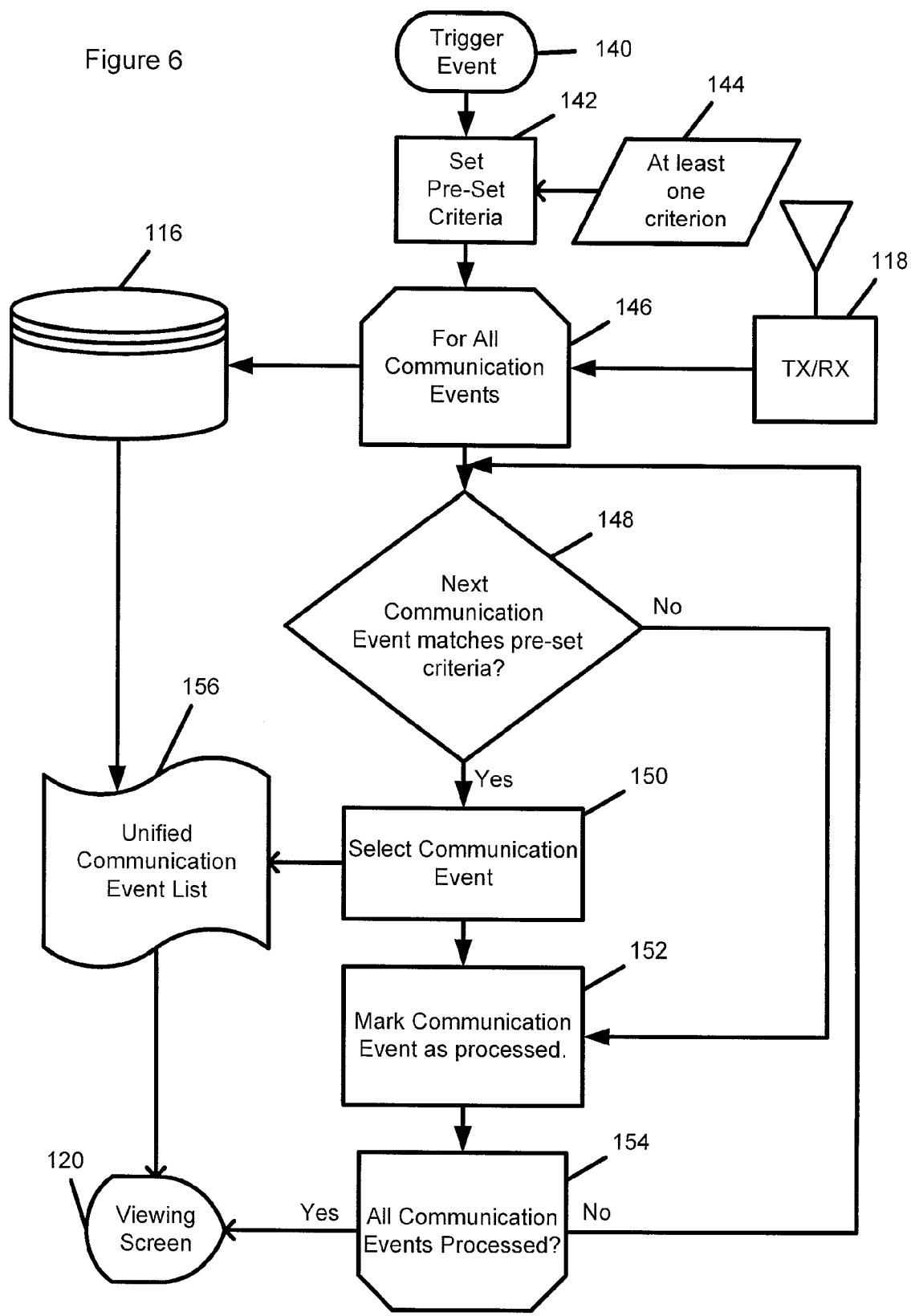
FIG. 6 illustrates a data flow for a mobile device of the present invention.

FIG. 6 illustrates an exemplary embodiment of a data flow of the present invention. A pre-defined trigger event 140, such as an incoming SMS message is used as a preset criterion 142. At least one criterion 144 is set in the preset criteria 142. The at least one criteria 144 may be communication from a specific party. In this case, preset criteria 142 would correspond to both the triggered event, the receipt of a SMS message, and the at least one criterion 144, correspondence with a given individual. This would set the preset criteria 142 as correspondence with a certain individual via a SMS message. Preset criteria 142 is used, in a presently preferred embodiment, so that only communications events fitting a predefined profile will results in the retrieval of a communications event history from database 116. In alternate embodiments of the present inventions, all communications events will result in the retrieval of a communications event history from database 116 using a method, such as the one illustrated in FIG. 3. Transceiver 118 is used by mobile device 112 to receive a communications event. Upon receipt of any communications event the preset criteria is compared to the received communications event. If the preset criteria 142 and the received communications event from transceiver 118 match, the process proceeds through the flow to decision 148, where a determination is made of whether or not the communications event matches the preset criteria. If the communications event matches the preset criteria, mobile device 112 proceeds to step 150 where the selected communications event is added to the unified communications event list in step 156, which is stored in database 116. At this point, mobile device 112 marks the communications event as processed in step 152. If the next communications event did not match the preset criteria in decision 148, mobile device 112 would have proceeded to mark the communications event as processed 152 without selecting the communications event and adding it to the unified communications event list 156. Following the marking of the communications event as processed in step 152, a decision is made as to whether or not all communications events have been processed in decision 154. If all outstanding communications events have not been processed, mobile device 112 returns to step 148. Otherwise, in conjunction with the unified communications event list 156, which is obtained from database 116, user interface 124 is provided on display 120.

Figure 7:
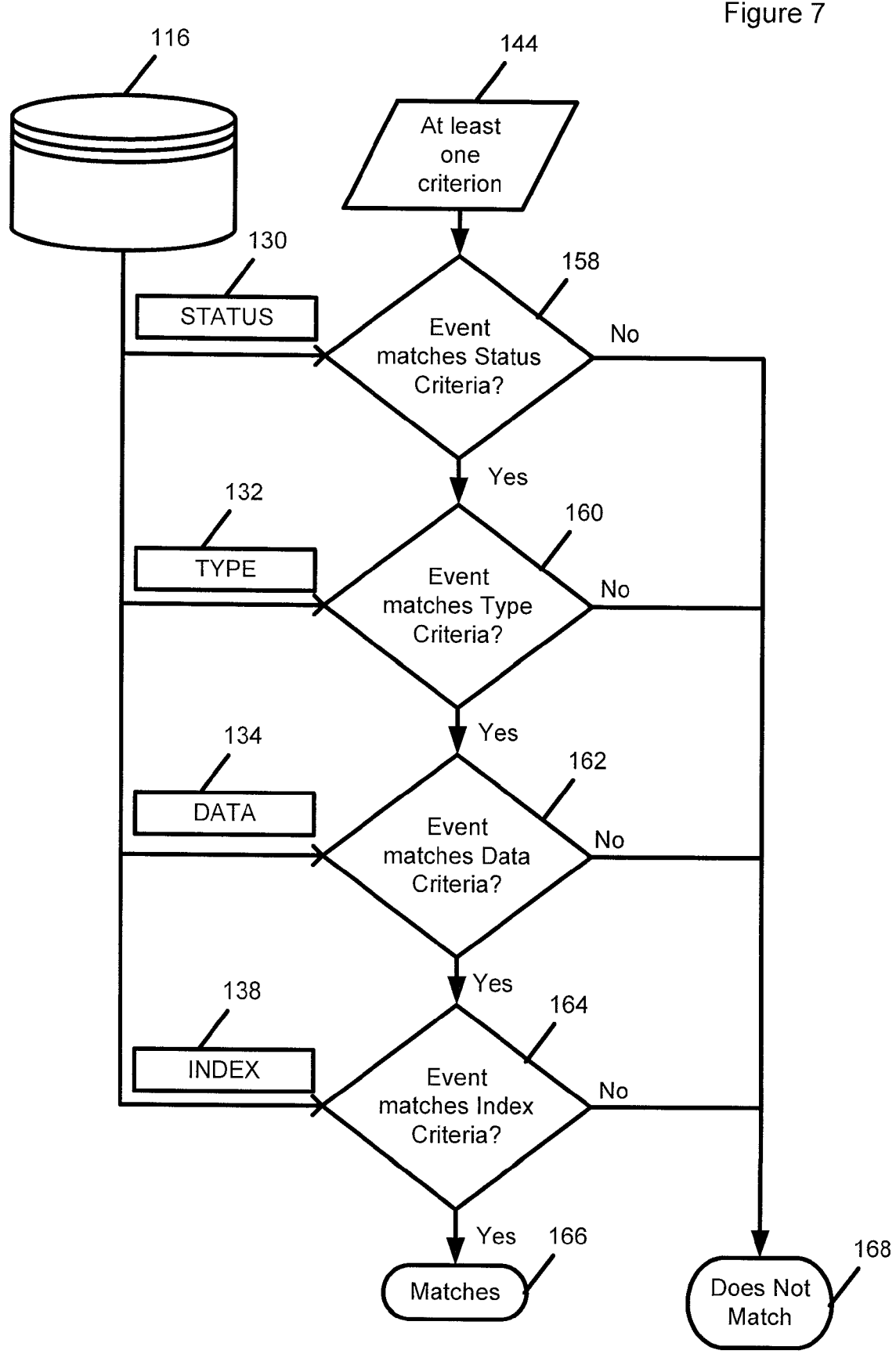
FIG. 7 illustrates a data flow for a mobile device of the present invention.

The comparison as illustrated, in FIG. 6, to determine whether or not a set of criteria has been matched, will now be illustrated in FIG. 7 in greater detail with reference to the embodiment of the table 128 as shown in FIG. 5. FIG. 7 illustrates database 116 which has contains table 128 having fields for status 130, type 132, data 134 and an index 138. The at least one criteria 144 is predetermined by the user. Upon receipt of an incoming communications event, the at least one criteria is compared to the status 130, type 132, data 134, and index 138 of the incoming communications event. If the event matches the status criteria in 158, it is then compared to the type criteria in step 160. If in step 160, the event matches the type criteria, it is further compared to the data criteria in 162, and pending successful completion of the event matching the data criteria, the event is matched to the index criteria in step 164. If in any of the comparisons 158, 160, 162 or 164, the event is not matched to one of the criteria, mobile device 112 proceeds to a does not match state 168. If all of these comparisons are successful, mobile device 112 proceeds to a match state 166. Upon reaching a match state 166, processor 122 queries database 116 to retrieve the communications event history. If does not match state 168 is reached, processor 122 waits for the next communications event. The order as implied by FIG. 7 is not a required order, and the comparisons can be carried out in any order or in parallel. The presently illustrated order was selected for simplicity, and is to be considered merely exemplary in nature.

As described above, a presently preferred embodiment of the present invention cross-links the correspondent identification information with information contained in an address book accessible to mobile device 112. This allows the address book information to be used to link SMS addresses, telephone numbers for cellular, home and work phones, a plurality of e-mail addresses, and WAP accessible sites associated with a single individual or entity, to each other. This cross-linking of address based information allows a user to properly put in context all communication with the individual from whom a message has been received.

In many mobile devices 112, the ability to integrate with a centralized e-mail server, using such standard protocols as the point of presence (POP) protocol is used to provide a seamless transition between the mobile device 112 and the central e-mail account. In this case, a user of the mobile device 112 is able to reply to e-mail messages from either a desktop computer, or mobile device 112 seamlessly. In a presently preferred embodiment, the mobile device 112 is updated through contact with a central server to reflect that e-mail messages replied to from the desktop have been replied to. Thus, the user of the mobile device 112 will be able to completely determine the context of a received message.

In an exemplary embodiment, all communications events including messages and calls originating from the mobile device, messages received and sent from a desktop computer, and all other communications events accessible to the mobile device are stored in a database 116. Database 116 is preferably integrated with the mobile device 112, though it is fully contemplated that database 116 can reside in a central server and be accessed wirelessly by mobile device 112. The implementation of such a system will be well understood by those skilled in the art.

The database 112 preferably tracks the type 132 of communications event, the data 134 contained in the communications event, and preferably a status 130 of the event. The type of the event 132 typically denotes whether it was a telephone call, a SMS message, an e-mail message, a WAP data transmission, or other data based transaction. The type field 132 also indicates whether the communication was received by the user of the mobile device, or originated from the user of the mobile device. The data field 134 typically contains the body of an e-mail message, the body of a SMS message, information related to the WAP data transmission, or call length, as appropriate. The status 130 of the message typically indicates whether a placed or received call was answered, or if a received message was replied to. One skilled in the art will readily appreciate that it is preferable to index this data with an index field 138, however, the implementation of an index is purely optional, though understood by one skilled in the art. Thus, in operation, a mobile device 112 of the present invention will receive a communications event and prior to displaying notification of this event, be it an e-mail message, a SMS message, or a telephone call, the processor of the mobile device queries the database 116 using the calling number as a key. The calling number is typically transmitted to the processor of the mobile device using such services as call display, or visual call waiting, which will be well understood to those skilled in the art. The query to the database 116 using the incoming number or address, as a search perimeter will result in a query response containing a list of all communications events between the mobile device 112 or any account associated with mobile device 112, and the incoming address. This information is then presented to the user on the display 120 of the mobile device so that prior to answering a telephone call the user will know the date of the last communication. Alternatively, if a received SMS message is generating the notification, the user is provided with the context of the SMS message as a result of being able to view prior SMS messages, prior e-mail messages, and is also presented with the dates of the last call initiated to the SMS originating address.

In a presently preferred embodiment, the communications event history retrieved from database 116 is sorted chronologically, so that the newest information is presented at the top of the list. Additionally, a summary of the number of e-mail messages, SMS messages, WAP sessions, and telephone calls between the mobile device 112 or any account associated with it, and the party originating the message is presented.

One skilled in the art will readily appreciate that database 116 can be either a relational database, or a flat file database. Although the use of a relational database provides numerous benefits understood by those skilled in art, it is conceivable that an implementation of the present invention can be provided through the use of a flat file database. Additionally, one skilled in the art will readily appreciate that a number of methods of implementing the present invention using a relational database exist. For exemplary purposes, one such method is presented. It should be understood by those skilled in the art, that the presented method is intended to be exemplary, and not limiting of the scope of the present invention.

In a non-illustrated embodiment, any event, regardless of whether it is a communications event or any other event detectable by the mobile device 112, can trigger the message software interface module to use a particular pre-set criteria 142 to display select communications events in the communications event history. For example, in a mobile device 112 having an integrated date book, when a conference call scheduled in a datebook occurs, processor 122 triggers the communication software interface module 126 with pre-set criteria 142 to preferably select and represent a pending outgoing conference call communications event with higher priority than other select communications events. Alternatively, when mobile device 112 receives a communication, such as an e-mail message, SMS message, WAP page response, voice/video call, processor 122 triggers the communication software interface module 126 with pre-set criteria 142 to preferably select and represent the received communications event with higher priority than other select communications events.

The pre-set criteria can also match communications event data. For instance, to view all communications events sent to or received from a particular contact, the pre-set criteria may include matching select communications event data with all of the specific contact information found in an address book entry for the contact. As an example, consider all communications events sent to or received from a stockbroker. Contact information for the stockbroker is preferably kept in the address book. Preferably, each address book entry contains a variety of fields that can be mapped to one or more communications addresses supported by the mobile device. In the entry corresponding to the stockbroker, for example, if the following fields are defined: telephone number, mobile phone number, fax number, email address, and URL's; then an example preferable mapping to message types follows. The phone, mobile, and fax numbers are mapped to voice and/or video communications events. The mobile number is additionally mapped to an SMS address for SMS type communications events. The email address is mapped to email communications events. The URL's are mapped to corresponding communications event types. For instance an http URL can be mapped to web and/or WAP, whereas an FTP URL (File Transfer Protocol) can be mapped to an ftp communications event. All communications events, including phone calls, SMS communications events, emails, web communications events, WAP communications events or other communications events that match at least one field in the stockbroker contact entry of the address book would then be selected by the communications event software interface module 126, and would be displayed. Preferably, the presentation of the retrieved data from database 116 would show the contact name, such as "stockbroker" as defined by the preset criteria 142.

In another embodiment, the communications event software interface module 126 may identify related stored communications events by comparing the communications event data of each stored communications event 128 with keywords selected by the user. This alternative method of matching the current communications event with select stored communications events 128 may be implemented by itself, or as a means of further limiting the select communications events identified by the other methods described above. To continue the previous stockbroker example, further pre-set criteria can be added to create a further filter that operates on the select communications events, for instance. The communications event data in the new filter may include stock quotes obtained via WAP using an URL as well as notes taken during phone calls with the stockbroker. The user may therefore decide to choose pre-set criteria that, as well as matching contact information, further matches a regular expression, such as for example, the keywords "buy" or "sell". By allowing the user to configure the pre-set criteria, the communications event software interface module 126 unifies communications events based on pre-set criteria which are important to the user at a specific point in time, for instance, allowing the user to unify a stock pick provided by a stockbroker over a phone call or e-mail with a stock quote retrieved subsequently by the user via WAP in order to take a decision to either communicate a buy, sell, or hold directive to his stockbroker or to a trading system.

Thus far the system of the present invention has been described as integrated in mobile device 112, it will be understood by one skilled in the art that a software implementation of the present invention can be executed on a number of different platforms, or packaged for use on different platforms. In one such example, a desktop computer can be configured to use the communications event handler of the present invention to provide a communications event history for received email messages. Additionally, the desktop computer may be attached to an SMS modem so that it is capable of receiving SMS messages and can then provide a communications event history to a user to permit the user to determine the context of a received SMS message. Additionally, the desktop computer can be configured so that it is in communication with a Voice-over-Internet-Protocol (VoIP) telephone, so that all incoming and outgoing calls are recorded to the communications event database 116. In such an implementation, the communications event handler would use a communications event database interface to communicate with either a local or remote communications event database 116 to retrieve the communications event histories associated with correspondents identified using either call display information, or addressing information extracted from the header of an incoming e-mail or SMS message.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:
1. A wireless device, comprising:
   a viewing screen;
   a processor;
   a memory device that stores communication events of a plurality of different communication types that have been transmitted or received by the wireless device; and
   a communication event software interface module executed by the processor configured to:
      identify, using identification information obtained from a first communication event, an address book contact in an address book accessible by the wireless device;
      filter communication events previously stored in the memory device using the identified address book contact to identify one or more communication events meeting pre-set criteria, the pre-set criteria comprising a match with the identified address book contact;
      display the identified one or more communication events on the viewing screen.
2. The wireless device of claim 1, wherein the plurality of different communication types is selected from the group consisting of: e-mail, SMS, voice call, instant messaging session, and calendar events.

3. The wireless device of claim 1, wherein the identification information comprises at least one identifier selected from the group consisting of: e-mail address, MSISDN, URI, IP address, PIN, and name.

4. The wireless device of claim 1, wherein the pre-set criteria further comprises a match with an attribute of a new communication event being composed by a user of the wireless device.

5. The wireless device of claim 1, wherein the pre-set criteria further comprises a condition that a user of the wireless device has not attended to the communication events.

6. The wireless device of claim 1, wherein the first communication event comprises a recently received communication event.

7. The wireless device of claim 1, wherein communication events previously stored in the memory device are filtered using a plurality of contact addresses stored in association with the identified address book contact.

8. The wireless device of claim 1, wherein the address book is stored at the wireless device.

9. A wireless device, comprising:
a viewing screen;
a memory device that stores communication events of different communication event types that have been transmitted or received by the wireless device; and
a processor configured to:
display, on the viewing screen, a first communication event of a first communication event type;
identify an originating address of the displayed first communication event;
access an address book to identify a contact corresponding to the originating address stored in the address book, the contact being associated with a plurality of addresses;
retrieve, from the memory, a plurality of communication events corresponding to the plurality of addresses, the retrieved plurality of communication events comprising communication events of different communication event types; and
display the retrieved plurality of communication events on the viewing screen.

10. The wireless device of claim 9, wherein the different communication types comprise at least: e-mail and SMS.

11. The wireless device of claim 9, wherein the different communication event types are selected from the group consisting of: e-mail, SMS, voice call, instant message, and video communication.

12. The wireless device of claim 9, wherein the plurality of addresses comprises at least an e-mail address and a mobile number.

13. The wireless device of claim 9, wherein the plurality of addresses is selected from the group consisting of: e-mail address, MSISDN, URI, and IP address.

14. The wireless device of claim 9, wherein retrieved plurality of communication events includes the first communication event.

15. The wireless device of claim 9, wherein the first communication event comprises an incoming communication event.

16. The wireless device of claim 9, wherein the first communication event comprises a new communication event being composed by a user of the wireless device.

17. A method for displaying communication events on a wireless device, comprising the steps of:
identifying, using identification information obtained from a first communication event, an address book contact in an address book accessible by the wireless device;
filtering communication events previously stored by the wireless device using the identified address book contact to identify one or more communication events meeting a pre-set criteria, the pre-set criteria comprising a match with the identified address book contact, the previously stored communication events comprising a plurality of different communication types; and
displaying the identified one or more communication events on a viewing screen of the wireless device.

18. The method of claim 17, wherein the plurality of different communication types is selected from the group consisting of: e-mail, SMS, voice call, instant messaging session, and calendar events.

19. The method of claim 17, wherein the identification information comprises at least one communication event identifier selected from the group consisting of: e-mail address, MSISDN, URI, IP address, PIN, and name.

20. The method of claim 17, wherein the pre-set criteria further comprises a match with an attribute of a new communication event being composed by a user of the wireless device.

21. The method of claim 17, wherein the pre-set criteria further comprises a condition that a user of the wireless device has not attended to the communication events.

22. The method of claim 17, wherein the first communication event comprises a recently received communication event.

23. The method of claim 17, wherein communication events previously stored in the memory device are filtered using a plurality of contact addresses stored in association with the identified address book contact.

24. The method of claim 17, wherein the address book is stored at the wireless device.

25. A method implemented at a wireless device, the wireless device being configured to transmit and receive communication events of different communication event types, the method comprising:
displaying a first communication event on a viewing screen of the wireless device, the first communication event being of a first communication event type;
identifying an originating address of the displayed first communication event;
accessing an address book to identify a contact corresponding to the originating address stored in the address book, the contact being associated with a plurality of addresses;
retrieving, from memory of the wireless device, a plurality of communication events corresponding to the plurality of addresses, the retrieved plurality of communication events comprising communication events of different communication event types; and
displaying the retrieved plurality of communication events on the viewing screen.

26. The method of claim 25, wherein the different communication event types comprise at least e-mail and SMS.

27. The method of claim 25, wherein the different communication event types are selected from the group consisting of: e-mail, SMS, voice call, instant message, and video communication.

28. The method of claim 25, wherein the plurality of addresses comprises at least an e-mail address and a mobile number.

29. The method of claim 25, wherein the plurality of addresses is selected from the group consisting of: e-mail address, MSISDN, URI, and IP address.

30. The method of claim 25, wherein the retrieved plurality of communication events includes the first communication event.

31. The method of claim 25, wherein the first communication event comprises an incoming communication event.

32. The method of claim 25, wherein the first communication event comprises a new communication event being composed by a user of the wireless device.

\* \* \* \* \*